(12) United States Patent
Ishida

(10) Patent No.: US 8,498,036 B2
(45) Date of Patent: Jul. 30, 2013

(54) OPTICAL SCANNING APPARATUS AND IMAGE FORMING APPARATUS

(71) Applicant: Daisuke Ishida, Fujimi (JP)

(72) Inventor: Daisuke Ishida, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/661,092

(22) Filed: Oct. 26, 2012

(65) Prior Publication Data
US 2013/0044359 A1 Feb. 21, 2013

Related U.S. Application Data

(63) Continuation of application No. 12/687,210, filed on Jan. 14, 2010, now Pat. No. 8,320,034.

(30) Foreign Application Priority Data

Jan. 21, 2009 (JP) ................................. 2009-010896

(51) Int. Cl.
G02B 26/08 (2006.01)

(52) U.S. Cl.
USPC ..................... 359/200.7; 359/199.4

(58) Field of Classification Search
USPC ........................... 359/199.4, 200.7
See application file for complete search history.

(56) References Cited

U.S. PATENT DOCUMENTS 5,691,834 A  11/1997  Plesko

FOREIGN PATENT DOCUMENTS

| JP | 61-154264 | 7/1986 |
|---|---|---|
| JP | 07-148627 | 6/1995 |
| JP | 09-91584 | 4/1997 |
| JP | 11-253562 | 9/1999 |
| JP | 2000-058355 | 2/2000 |
| JP | 2008-142454 | 6/2008 |
| JP | 2010-048898 | 3/2010 |

*Primary Examiner* — James Phan
(74) *Attorney, Agent, or Firm* — Harness, Dickey & Pierce, P.L.C.

(57) ABSTRACT

An optical scanning apparatus that scans a light beam from a light source includes: a movable portion and a fixed portion. The movable portion includes: a rotating member, which is capable of rotating about a rotation axis being parallel with an optical axis of the light beam, has an open hole through which the light beam passes, and is provided with a first coil; and a mirror that is provided to the rotating member, electrically connected with the first coil, and reflects the light beam that passes through the open hole of the rotating member in a variable angle with respect to the optical axis of the light beam. The fixed portion includes: a magnetic member; and a second coil capable of supplying an electromagnetic field to the first coil. One of a part and a whole of the magnetic member is made of a magnetic material and the magnetic member serves as a magnetic core of the second coil.

7 Claims, 7 Drawing Sheets

OPTICAL SCANNING APPARATUS AND IMAGE FORMING APPARATUS

CROSS-REFERENCE TO RELATED APPLICATIONS

This is a continuation application of U.S. application Ser. No. 12/687,210 filed Jan. 14, 2010, now U.S. Pat No. 8,320,034, which claims priority from Japanese Patent Application No. 2009-010896, filed on Jan. 21, 2009, all of which are incorporated herein by reference in their entireties.

BACKGROUND

1. Technical Field

The present invention relates to a technique using optical scanning. For example, the invention relates to an optical scanning apparatus and an image forming apparatus.

2. Related Art

An optical scanner is known as an example of an optical device which performs drawing by using optical scan in a laser printer and the like. The optical scanner can be formed by processing a silicon substrate by micro electro mechanical systems (MEMS), for example. Such the optical scanner can project and display an image or a video picture on a flat surface (a screen) by performing optical scan in a double-axis (X axis and Y axis, for example) direction (hereinafter, referred to as X-Y scan).

However, in a case where a surface (screen) on which an image or a video picture is projected is a spherical surface, a curved surface, or the like in a three-dimensional shape such as a spherie, a hemisphere, and a cylinder, the X-Y scan may be inefficient. When the X-Y scan is performed with respect to a hemispherical screen shown in FIG. 8, for example, light is scanned not only on a region inside the screen but also on a region outside the screen as shown by diagonal lines in FIG. 9. In this case, light scanned on the outside of the screen as shown by the diagonal lines is wasted to be inefficient.

Therefore, as one of methods for efficiently performing optical scan with respect to a three-dimensional screen, optical scan in a polar-coordinate (r-θ) direction (hereinafter, referred to as r-θ scan) is considered instead of the X-Y scan. The r-θ scan is realized by combining a rotary action of an optical scanner around a predetermined rotation axis (θ direction) and a one-dimensional scan of the scanner along the rotation axis (r direction).

Here, when drive power is supplied to the optical scanner, formation of wiring is limited due to the rotary action of the optical scanner around the rotation axis. For example, in a case where the wiring is formed from a portion performing a rotary action to other fixed portion, the wiring is tangled due to the rotary action, whereby the rotary action of the optical scanner may be disturbed and the wiring may be damaged.

Therefore, to supply drive power to the optical scanner in a non-contact manner is considered. JP-A-9-91584, as an example, discloses a technique of non-contact power transmission. In the example, in order to take surrounding images by a video camera, drive power is supplied (transmitted) to a rotating body, on which the video camera is mounted in a non-contact manner, by using electromagnetic induction of a magnetic field generating coil.

However, this related art uses the magnetic field generating coil having no magnetic core for the non-contact drive power transmission to the rotating body. Therefore, insufficient power may be supplied to a device and the like which are driving objects. On the other hand, in order to secure sufficient power, a long coil is required, for example, thus requiring a large power supply means disadvantageously.

SUMMARY

An advantage of the invention is to improve power supply (transmission) efficiency in non-contact power supply to a device, which performs rotary action in optical scan, such as an optical scanner.

The invention is not limited to the above advantage but is an effect derived from the following embodiment, and the invention also offers advantageous effects which have not been achieved in related arts.

An optical scanning apparatus, according to a first aspect of the invention, that scans a light beam from a light source includes: a movable portion and a fixed portion. The movable portion includes: a rotating member, which is capable of rotating about a rotation axis being parallel with an optical axis of the light beam, has an open hole through which the light beam passes, and is provided with a first coil; and a mirror that is provided to the rotating member, electrically connected with the first coil, and reflects the light beam that passes through the open hole of the rotating member in a variable angle with respect to the optical axis of the light beam. The fixed portion includes: a magnetic member; and a second coil capable of supplying an electromagnetic field to the first coil. One of a part and a whole of the magnetic member is made of a magnetic material and the magnetic member serves as a magnetic core of the second coil.

In the optical scanning apparatus of the aspect, the magnetic member may be a supporting member having a hollow structure through which the light beam passes toward the open hole of the rotating member. Further, the rotating member may have a shaft bearing rotatably supported by the supporting member in a manner that at least a part of the supporting member is inserted into the shaft bearing. Furthermore, the second coil may be provided along a periphery of the supporting member.

In the optical scanning apparatus of the aspect, the magnetic member may be a supporting member having a hollow structure rotatably supporting the rotating member in a manner to insert the rotating member thereinto, and the second coil may be provided along a periphery of the supporting member.

In the optical scanning apparatus of the aspect, a section of the magnetic member may have a square C-shape, and the second coil may be provided along at least a part of a periphery of the magnetic member having the square C-shape. Further, the magnetic member may be disposed so as to form a predetermined gap between a leg portion of the square C-shape and a lateral surface of the rotating member.

In the optical scanning apparatus of the aspect, the first coil and the mirror may be electrically connected with each other by a wiring going through the open hole of the rotating member.

In the optical scanning apparatus of the aspect, the first coil and the mirror may be electrically connected with each other by a wiring going through a through hole formed in the rotating member.

An image forming apparatus according to a second aspect of the invention includes the optical scanning apparatus of the first aspect. In the image forming apparatus, a reflection angle of the mirror is controlled by induced electromotive force that is generated around the first coil in a manner to correspond to the electromagnetic field, so as to emit the light beam.

BRIEF DESCRIPTION OF THE DRAWINGS

The invention will be described with reference to the accompanying drawings, wherein like numbers reference like elements.

DESCRIPTION OF EXEMPLARY EMBODIMENT

An embodiment of the present invention will now be described with reference to the accompanying drawings. Note that the following embodiment is only an exemplification, and there is no intention to exclude various modifications and various technique-applications which are not shown below. That is, the present invention is applicable to various modifications without departing from the scope of the invention. Further, the drawings show same or similar numerals for elements which are same as or similar to each other. It should be understood that the drawings are schematic views, so that specific dimensions should be determined by a relation with the following descriptions. Further, dimensional relations and proportions are sometimes different among the drawings.

Figure 1:
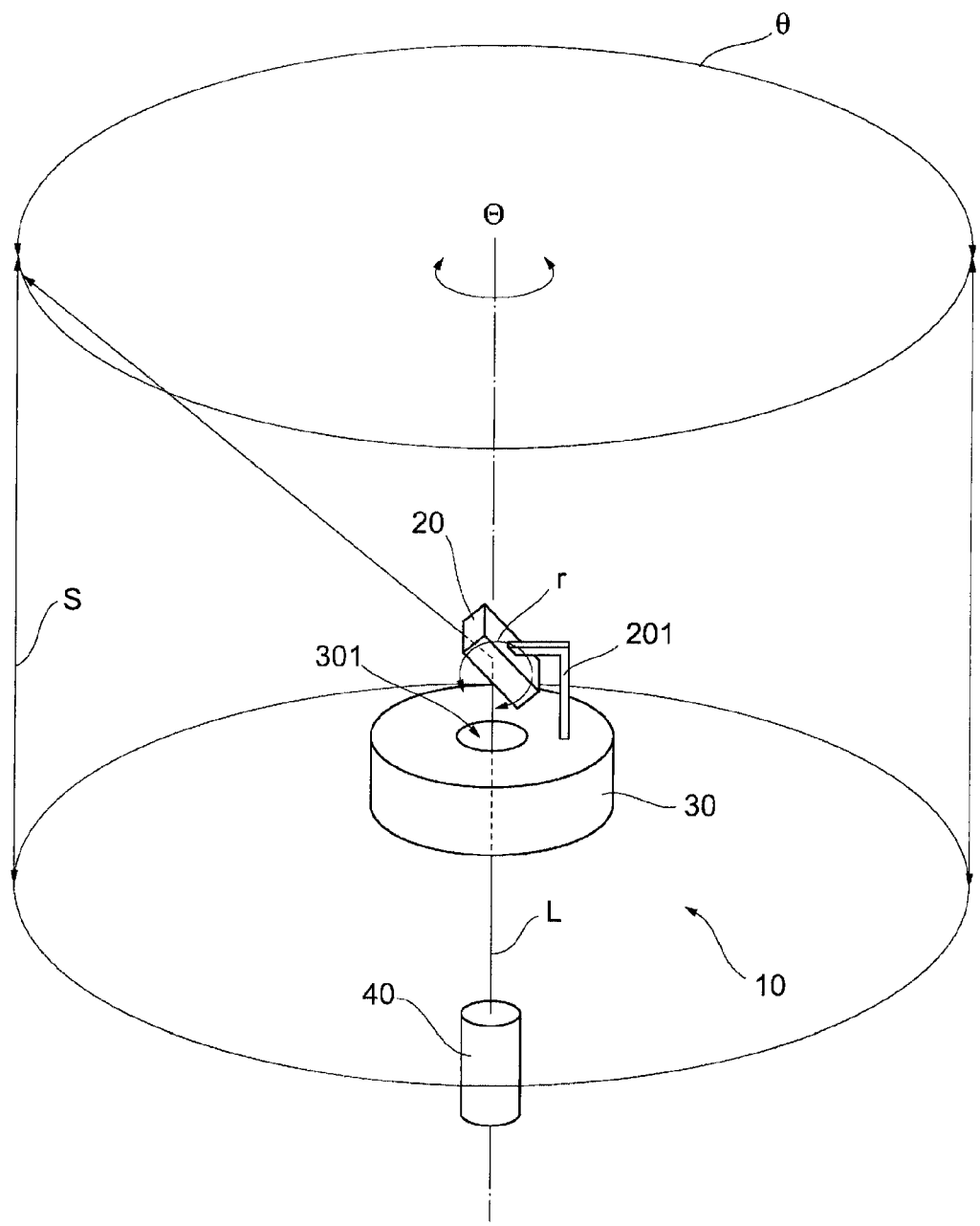
FIG. 1 is a diagram schematically showing an example of a structure of an optical scanning apparatus according to an embodiment of the invention.

FIG. 1 is a perspective view schematically showing an example of a structure of an optical scanning apparatus 10 according to an embodiment of the invention. This optical scanning apparatus 10 shown in FIG. 1 includes an optical scanner 20; a rotating table (rotating member) 30 provided with the optical scanner 20; and a laser light source 40 outputting laser light (light beam) L used in optical scan. The optical scanner 20 and the rotating table 30 serve as a movable portion of the optical scanning apparatus 10.

The rotating table 30 has a hollow portion 301 having a predetermined radius around a rotation axis Θ, that is, the rotating table 30 has a toroidal shape, for example. The rotating table 30 can be rotated about the rotation axis Θ by 360 or more degrees by a driving circuit such as a motor and the like. Here, the rotating table 30 may be a hollow motor itself.

The light beam L outputted from the laser light source 40 passes through the hollow portion 301. Therefore, a diameter (sectional area) of the hollow portion 301 is only necessary to be equal to or more than a diameter (sectional area) of the light beam L. For example, a through hole through which the light beam L can pass may be formed in a rotating shaft (motor shaft) of the hollow motor serving as the rotating table 30. Examples of a motor driving the rotating table 30 or the hollow motor include a direct driving motor, a stepping motor, a servomotor, a DC motor, and the like. As a method for rotating the rotating table 30 (driving mechanism), not only a method in which drive force is supplied to the rotating shaft of the rotating table 30 as above but also a method in which drive force is supplied to a periphery (circumference) of the rotating table 30 are applicable. For example, the periphery of the rotating table 30 may be formed to have a gear shape and thus the gear of the rotating table 30 may be engaged with the motor to rotate the table 30.

The optical scanner 20 is provided with a mirror (one-dimensional scanning mirror) 24 (refer to FIG. 2) enabling one-dimensional optical scan as described later. The mirror 24 is provided to the rotating table 30 such that the light beam L, which passes through the hollow portion 301 of the rotating table 30, can be incident on a face of the mirror 24.

The optical scanner 20 (the mirror 24) is supported by a supporting member 201 provided on a surface, excluding the hollow portion 301, of the rotating table 30 so as the mirror 24 to be positioned and fixed on an optical path (optical axis) of the light beam L.

In other words, the mirror 24 can rotate about the rotation axis Θ which is parallel to the optical axis of the light beam L while receiving the light beam L which passes through the hollow portion 301 of the rotating table 30. Further, the optical scanner 20 has a rotation axis R (refer to FIG. 2) in a direction crossing with the rotation axis Θ, for example, in a direction orthogonal to the rotation axis Θ so as to be able to turn in a direction shown by an arrow r in FIG. 1 around the rotation axis R within a predetermined angle (single axis scanning).

Figure 2:
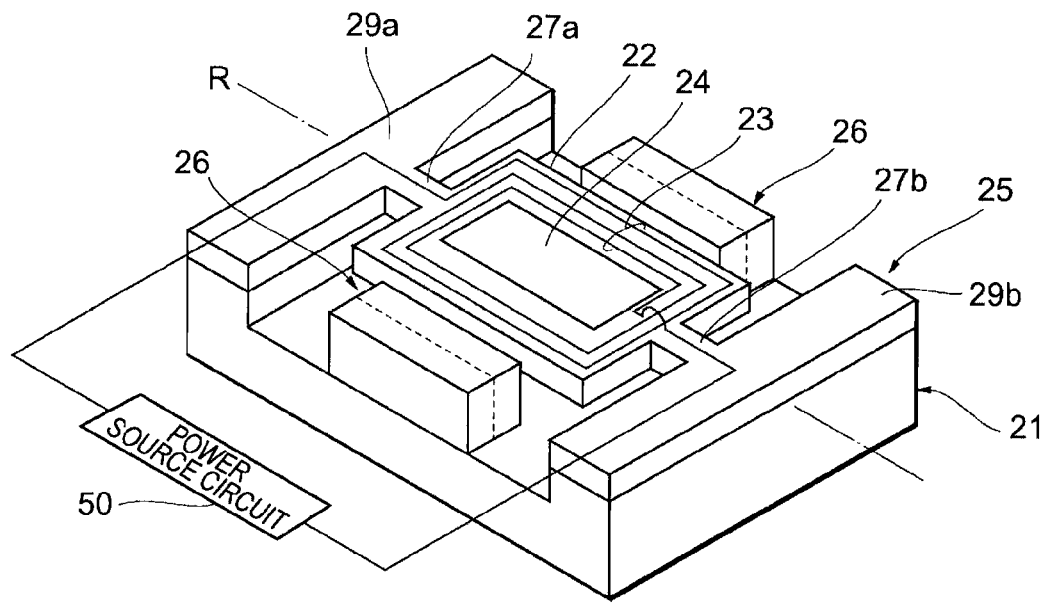
FIG. 2 is a perspective view schematically showing a structure of an optical scanner illustrated in FIG. 1.
Figure 3:
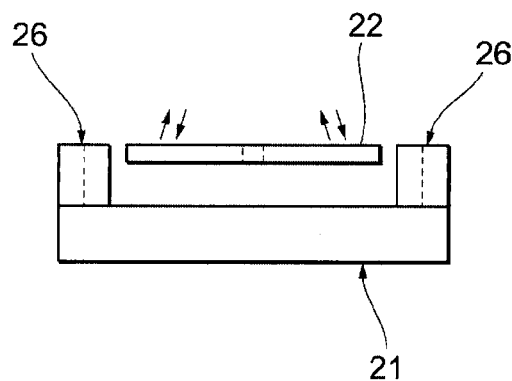
FIG. 3 is a sectional view schematically showing the optical scanner of FIG. 2 viewed from a direction orthogonal to a rotation axis.

FIGS. 2 and 3 show an example of a structure of the optical scanner 20. FIG. 2 is a schematic perspective view of the optical scanner. FIG. 3 is a schematic sectional view of the optical scanner 20 viewed from a direction orthogonal to the rotation axis R.

The optical scanner 20 illustrated in FIG. 2 includes a base 21 having a concave space; and a movable mirror substrate 25 having a movable plate 22 and the mirror 24 mentioned above and provided on a surface of the movable plate 22, for example. Here, a control circuit (power source circuit) 50 controls vibration (turn) of the movable plate 22 (the mirror 24). The power source circuit 50 includes an alternating-current (AC) source which is not shown, for example.

The base 21 may be a glass substrate, a silicon substrate, or the like, for example, and is formed to have a concave portion (space) permitting the movable plate 22 to vibrate (turn). The concave portion can be formed by etching the base 21 or by forming spacers on both ends of the base 21. In the concave portion, a pair of permanent magnets 26 is provided so as to sandwich the movable plate 22 from both sides to an extent not to disturb the vibration of the movable plate 22. Because of the permanent magnets 26, a magnetostatic field is formed in a space including the movable plate 22.

The movable mirror substrate 25 includes: the mirror 24 mentioned above; a coil 23 provided as a conductive pattern winding around the mirror 24 predetermined number of times to surround the mirror 24; a pair of torsion bars (torsion springs which are an example of an elastic member) 27a and 27b respectively provided at both ends of the movable plate 22; and supporting frame fixing portions 29a and 29b supporting the movable plate 22 respectively through the torsion bars 27a and 27b, for example. The movable mirror substrate 25 can be made of a silicon single-crystalline substrate (thin plate) by using a fine processing technique of micro electro mechanical systems (MEMS), for example, on the movable plate 22.

When the coil 23 receives current (drive power) supplied from the power source circuit 50, the coil 23 generates electromagnetic force due to electromagnetic force action (Fleming's left hand rule) with respect to magnetostatic field generated by the permanent magnets 26. Depending on the electromagnetic force which is generated, the movable plate 22 can turn around the torsion bars 27a and 27b, which are an example of an elastic member, as the rotation axis R as shown in FIG. 3, for example. A turning range (swing angle) can be controlled depending on a value of driving current supplied from the power source circuit 50.

The mirror 24 reflects the light beam L, which passes through the hollow portion 301 of the rotating table 30 to be incident on the mirror 24, at a variable angle (swing angle) with respect to the optical axis of the light beam L. The swing angle of the movable plate 22 is controlled by the power source circuit 50 as described above, being able to control a reflection angle of the light beam L.

In terms of an operation of the optical scanner 20 structured as above, in a period that current is supplied to the coil 23 (ON) from the power source circuit 50 (AC source), electromagnetic force is generated around the coil 23 due to the electromagnetic force action described above, so that the movable plate 22 turns around the torsion bars 27a and 27b as the rotation axis R by a swing angle corresponding to the current value. On the other hand, in a period that current is not supplied (OFF), the electromagnetic force action disappears, and the movable plate 22 returns to an original position due to restorative force of the torsion bars 27a and 27b serving as the elastic members.

When such ON-OFF operation is performed at high speed depending on a cycle of the AC source, the movable plate 22 gets in a resonant condition at a predetermined frequency (switching frequency or driving frequency), stabilizing the swing angle of the movable plate 22, that is, the swing angle of the mirror 24 at a predetermined angle. The optical scanner 20 is used in such the resonant condition in which the swing angle is stabilized.

For example, the light beam L outputted by the laser light source 40 is made incident on the mirror 24 and the light reflected by the mirror 24 can be used for optical scan. Therefore, the laser light source 40 is disposed to be opposed to the optical scanner 20 with the rotating table 30 interposed in a manner that the optical path (optical axis) of the light beam goes along the rotation axis Θ, for example. Accordingly, the light beam L outputted from the laser light source 40 passes through the hollow portion 301 of the rotating table 30 along the rotation axis Θ of the rotating table 30 so as to be incident on the mirror 24 of the optical scanner 20.

As long as the light beam L can pass through the hollow portion 301 of the rotating table 30 to be incident on the mirror 24, the disposing position of the laser light source 40 is not limited to the rotation axis Θ or an adjacent position of the rotation axis Θ. For example, one or a plurality of mirrors may be provided on the optical path of the light beam L so as to dispose the laser light source 40 in a different direction from a direction along the rotation axis Θ of the rotating table 30.

Further, the moving coil type electromagnetic mirror is described as an example of the optical scanner 20 in the embodiment, but a driving method is not limited as long as one dimensional (single axis) scan is available. However, an application of a mirror enabling two dimensional (double axis) or more dimensional scan is not excluded.

Operations of the optical scanning apparatus 10 including the optical scanner 20 described above will now be described.

The light beam L outputted from the laser light source 40 passes through the hollow portion 301 of the rotating table 30 to be incident on the mirror 24 of the optical scanner 20. The optical scanner 20 is turned in a direction shown by the arrow r in FIG. 1 while being turned around the rotation axis R (refer to FIG. 2) by the electromagnetic force action as described above, and thus the light beam L reflected by the mirror 24 is scanned in a direction shown by an arrow S in FIG. 1.

Further, the light beam L reflected by the mirror 24 is scanned in a direction shown by an arrow θ in FIG. 1 by rotating the rotating table 30 around the rotation axis Θ which is parallel to the optical axis of the light beam L. As described above, the light beam L can be scanned on the whole of a cylindrical screen of which a center axis is the rotation axis Θ by combining the turn of the optical scanner 20 around the rotation axis R and the rotation of the rotating table 30 around the rotation axis Θ. Accordingly, an image and a video picture can be efficiently projected on the whole of the cylindrical screen.

As illustrated in FIG. 1, the laser light source 40 is disposed to be opposed to the optical scanner 20 (mirror 24) with the rotating table 30 interposed, and the light beam L passes through the hollow portion 301 of the rotating table 30 to be incident on the mirror 24 of the optical scanner 20. Accordingly, no wirings for the laser light source 40 and the rotating table 30 are required between a projection screen and the optical scanner 20.

Further, the laser light source 40 can be provided on a position apart from the rotating table 30 and the optical scanner 20 performing rotary action, so that the laser light source 40 can be formed as an individual unit which is not required to be rotary-driven. Consequently, any extra load is not imposed on the rotating table 30. Furthermore, a noise caused by the rotary action of the rotating table 30 and the optical scanner 20 can be prevented from affecting a driving signal of the laser light source 40. Thus, stable driving of the laser light source 40 can be realized.

The laser light source 40 can be disposed on the opposite side of the optical scanner 20 and the projection screen with the rotating table 30 interposed, being able to increase latitude of the size of the laser light source 40, further, being able to improve design latitude of an optical system.

Non-Contact Power Transmission Structure

Figure 4:
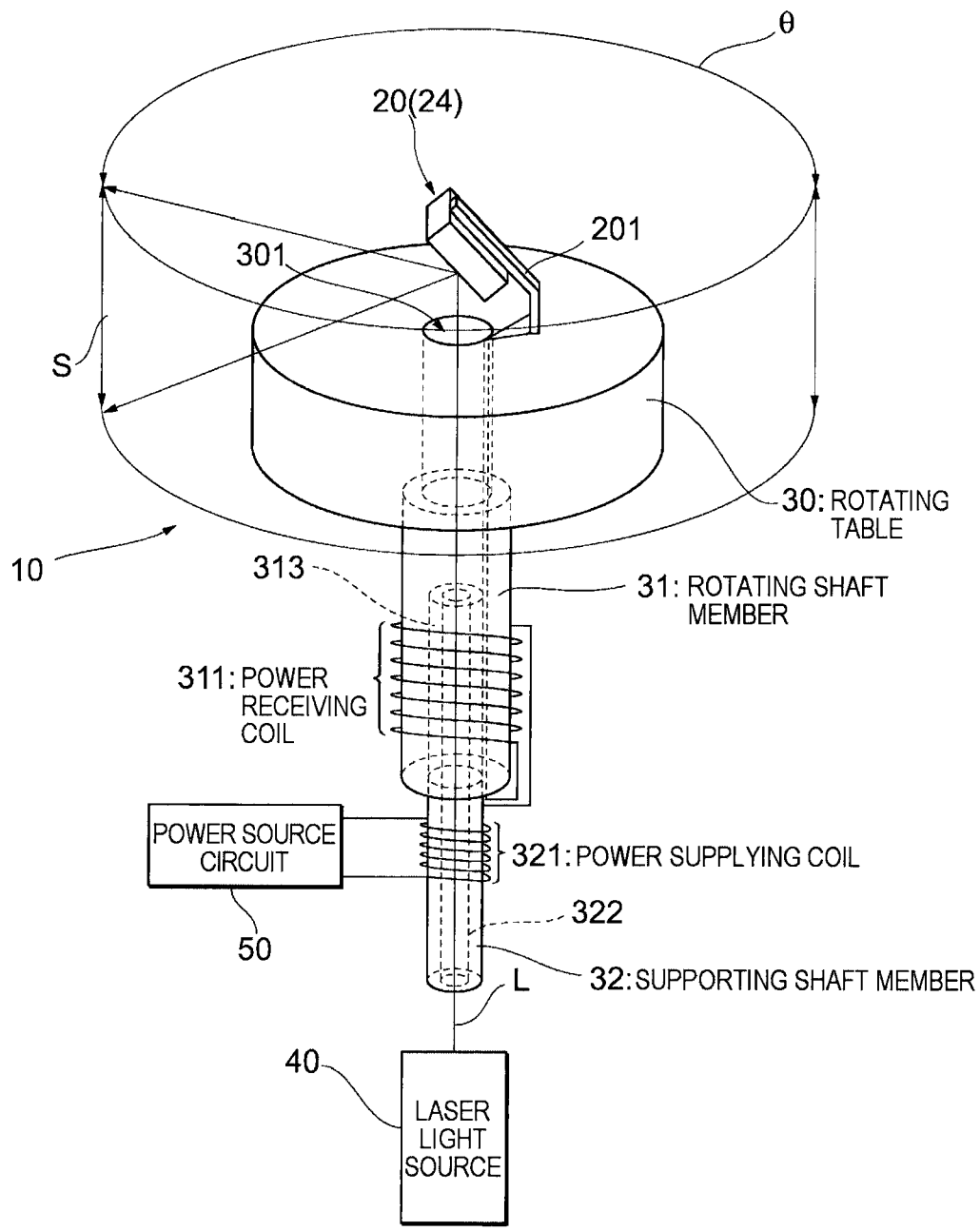
FIG. 4 is a perspective view schematically showing a structure of the optical scanning apparatus of FIG. 1 to which an example of a non-contact power transmission structure is applied.
Figure 5:
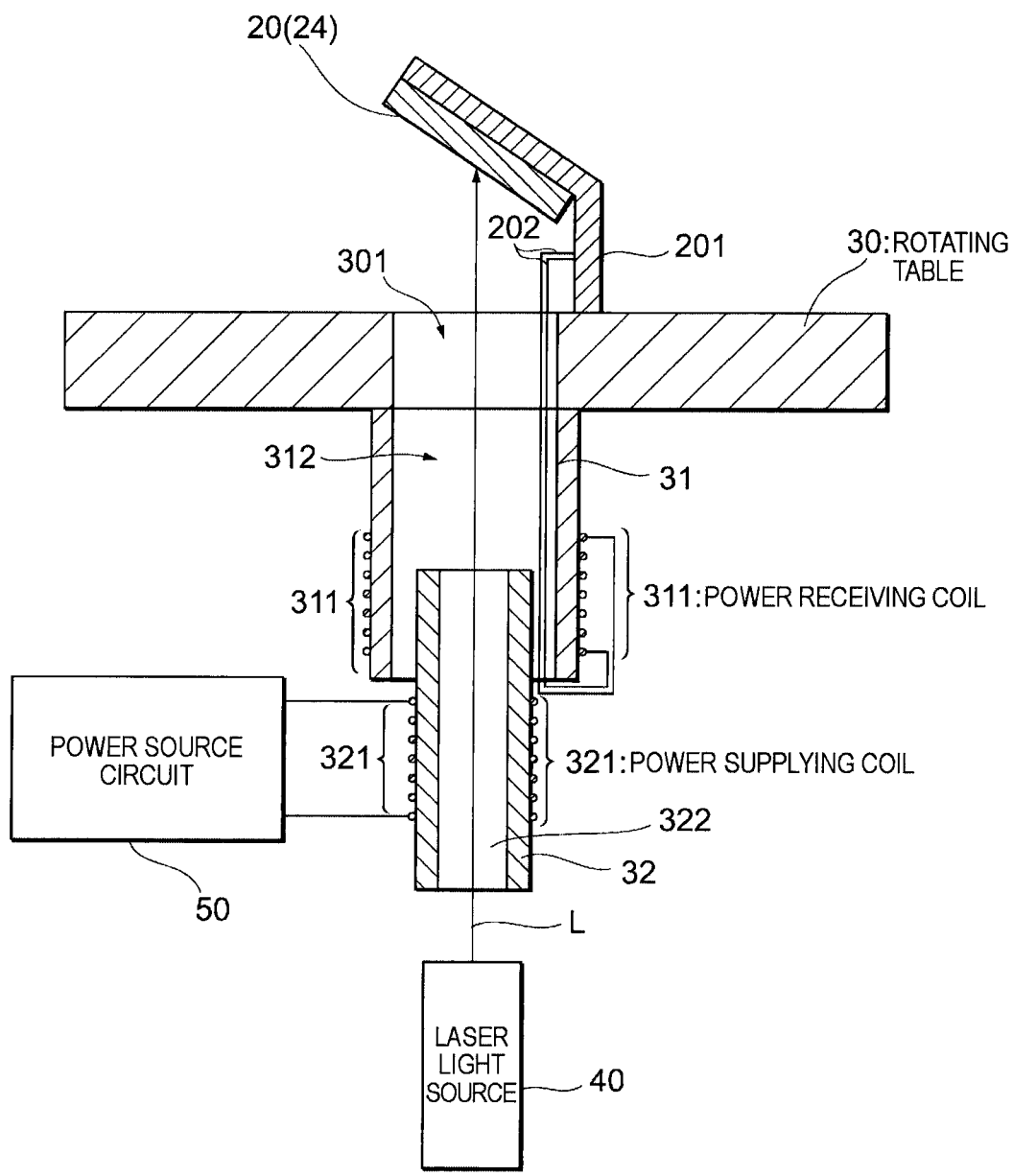
FIG. 5 is a schematic view of a section of the optical scanning apparatus of FIG. 4 cut at a plane along a rotation axis of a rotating table.

A method (structure) for supplying power, which is used for controlling the turn of the movable plate 22 (the mirror 24), to the optical scanner 20 provided to the rotating table 30 and being an element of the movable portion will be described with reference to FIGS. 4 and 5. FIG. 4 is a perspective view schematically showing a structure of the optical scanning apparatus 10 of FIG. 1 to which an example of a non-contact power transmission structure is applied. FIG. 5 is a schematic view of a section of the optical scanning apparatus 10 of FIG. 4 cut at a plane along the rotation axis Θ of the rotating table 30.

The power source circuit 50 illustrated in FIG. 2 can be provided to the rotating table 30 like the optical scanner 20, but stable scan may not be performed due to increased load on the rotating table 30 or degraded rotating balance. In the embodiment, the power source circuit 50 is provided separately from the rotating table 30 and power is supplied (transmitted) in a non-contact manner to the optical scanner 20 provided on the rotating table 30.

For example, the non-contact power transmission structure of the embodiment includes a rotating shaft member 31 fixed on the rotating table 30 and rotating together with the rotating table 30, and a supporting shaft member 32 rotatably supporting the rotating shaft member 31, as shown in FIGS. 4 and 5. The rotating shaft member 31 is an example of a rotating member constituting the movable portion of the optical scanning apparatus 10 together with the rotating table 30. The supporting shaft member 32 is an example of a supporting member (or a fixed member) constituting a fixed portion of the optical scanning apparatus 10 and does not rotate (is fixed) even when the rotating table 30 and the rotating shaft member 31 rotate.

The rotating shaft member 31 is provided with a power receiving coil (first coil) 311 and the supporting shaft member 32 is provided with a power supplying coil (second coil) 321.

When the power supplying coil 321 receives power (current) supply from the power source circuit 50, the power supplying coil 321 generates an electromagnetic field corresponding to a value of the received current. The power supplying coil 321 may be provided along a peripheral surface of the supporting shaft member 32. For example, a conductive wire (wiring material) having a predetermined length may be winded or a coil pattern may be formed, along the peripheral surface of the supporting shaft member 32.

The supporting shaft member 32 has a hollow structure having an open hole (hollow portion) 322, through which the light beam L can pass, that is, the member 32 has a cylindrical body, for example. The open hole 322 is only necessary to have a diameter (a sectional area) through which the light beam L can pass. A cross-sectional shape of the open hole 322 is not limited to a circular shape, but may be a polygonal shape as long as the light beam L can pass the hole.

A part (a part on which the power supplying coil 321 is provided, for example) of or the whole of the supporting shaft member 32 is preferably made of a magnetic material such as iron and ferrite. The supporting shaft member 32 made of the magnetic material functions as a magnetic member so as to serve as a magnetic core of the power supplying coil 321. Accordingly, intensity of the electromagnetic field generated by the power supplying coil 321 can be increased.

On the other hand, the power receiving coil 311 generates induction current (induced electromotive force) in response to electromagnetic induction action corresponding to the electromagnetic field generated by the power supplying coil 321. Accordingly, current (electric power) generated in the power receiving coil 311 can be supplied to the optical scanner 20 by electrically connecting (wiring) the power receiving coil 311 to the optical scanner 20, being able to drive (turn) the movable plate 22 (the mirror 24).

In the case where a part, to which the power supplying coil 321 is provided, or the whole of the supporting shaft member 32 is made of the magnetic material, the part or the whole of the supporting shaft member 32 as the magnetic member serves as the magnetic core of the power supplying coil 321. Therefore, larger induction current can be generated in the power receiving coil 311 compared to a case where the magnetic material is not used. In other words, power transmission efficiency from the power supplying coil 321 to the power receiving coil 311 can be improved. Here, the induction current generated in the power receiving coil 311 may be used not only for the optical scanner 20 but also for a signal processing circuit and the like which receive current (electric power) to be driven.

The power receiving coil 311 may be provided along a peripheral surface of the rotating shaft member 31. For example, a conductive wire (wiring material) having a predetermined length may be winded or a coil pattern may be formed, along the peripheral surface of the rotating shaft member 31.

The rotating shaft member 31 has a hollow structure having an open hole (hollow portion) 312, through which the light beam L can pass, that is, the member 31 has a cylindrical body, for example. The rotating shaft member 31 may be provided on an opposite surface of a surface, on which the optical scanner 20 is provided, of the rotating table 30 to be integrated with the table 30 in a manner that an axial core thereof agrees with the rotation axis Θ of the rotating table 30. For example, the rotating shaft member 31 may be integrally formed to be a part of the rotating table 30, or may be bonded and fixed on the rotating table 30 as a separate member.

In this case, in accordance with the rotation of the rotating table 30, the rotating shaft member 31 rotates about the rotation axis Θ in the same direction as that of the rotating table 30, and the power receiving coil 311 provided along the peripheral surface of the rotating shaft member 31 also rotates in the same direction. Accordingly, tangle of wirings, caused by the rotation of the rotating table 30, between the power receiving coil 311 and the optical scanner 20 and resulting damage of the wirings can be prevented. As shown in FIG. 5, wirings 202 between the power receiving coil 311 and the optical scanner 20 can be formed to go through the hollow portion 301 of the rotating table 30. This structure enables reinforcement of the protection of the wirings 202.

At least a part (a part where the power supplying coil 321 is not provided) of the supporting shaft member 32 is inserted in the hollow portion 312 of the rotating shaft member 31. The supporting shaft member 32 is separated from the rotating table 30 and the rotating shaft member 31. Accordingly, the rotating shaft member 31 can freely rotate about the rotation axis Θ of the rotating table 30. As an example of a structure rotatably supporting the rotating shaft member 31, various bearing mechanisms such as a ball bearing are available.

The hollow portion 301 of the rotating table 30, the open hole 322 of the supporting shaft member 32, and the open hole 312 of the rotating shaft member 31 communicate with each other, though their diameters (sectional areas) are different from each other. Accordingly, the light beam L outputted from the laser light source 40 can pass through the open hole 322 of the supporting shaft member 32, the open hole 312 of the rotating shaft member 31, and the hollow portion 301 of the rotating table 30 so as to be incident on the optical scanner 20 (the mirror 24).

As described above, a part or the whole of the supporting shaft member 32 having the open hole 322, through which the laser light L can pass, is made of the magnetic material. Accordingly, intensity of the electromagnetic field generated by the power supplying coil 321 which is provided on the peripheral surface of the supporting shaft member 32 can be increased and therefore an amount of induction current generated at the power receiving coil 311 can be increased.

Thus, in addition to the advantageous points described with reference to FIGS. 1 to 3, such an advantageous point is provided that power transmission efficiency from the power supplying coil 321 to the power receiving coil 311, eventually, to the optical scanner 20 can be improved and therefore sufficient drive power can be easily supplied to the optical scanner 20.

Further, as illustrated in FIGS. 4 and 5, the power supplying coil 321 is provided along the peripheral surface of the supporting shaft member 32 and the power receiving coil 311 is provided along the peripheral surface of the rotating shaft member 31 which is rotatably supported by the supporting shaft member 32. Thus, the coil 321 and the coil 311 can be provided in parallel with each other in a direction along the rotation axis Θ. Accordingly, the non-contact power transmission structure can be achieved with reduced space.

First Modification

Figure 6:
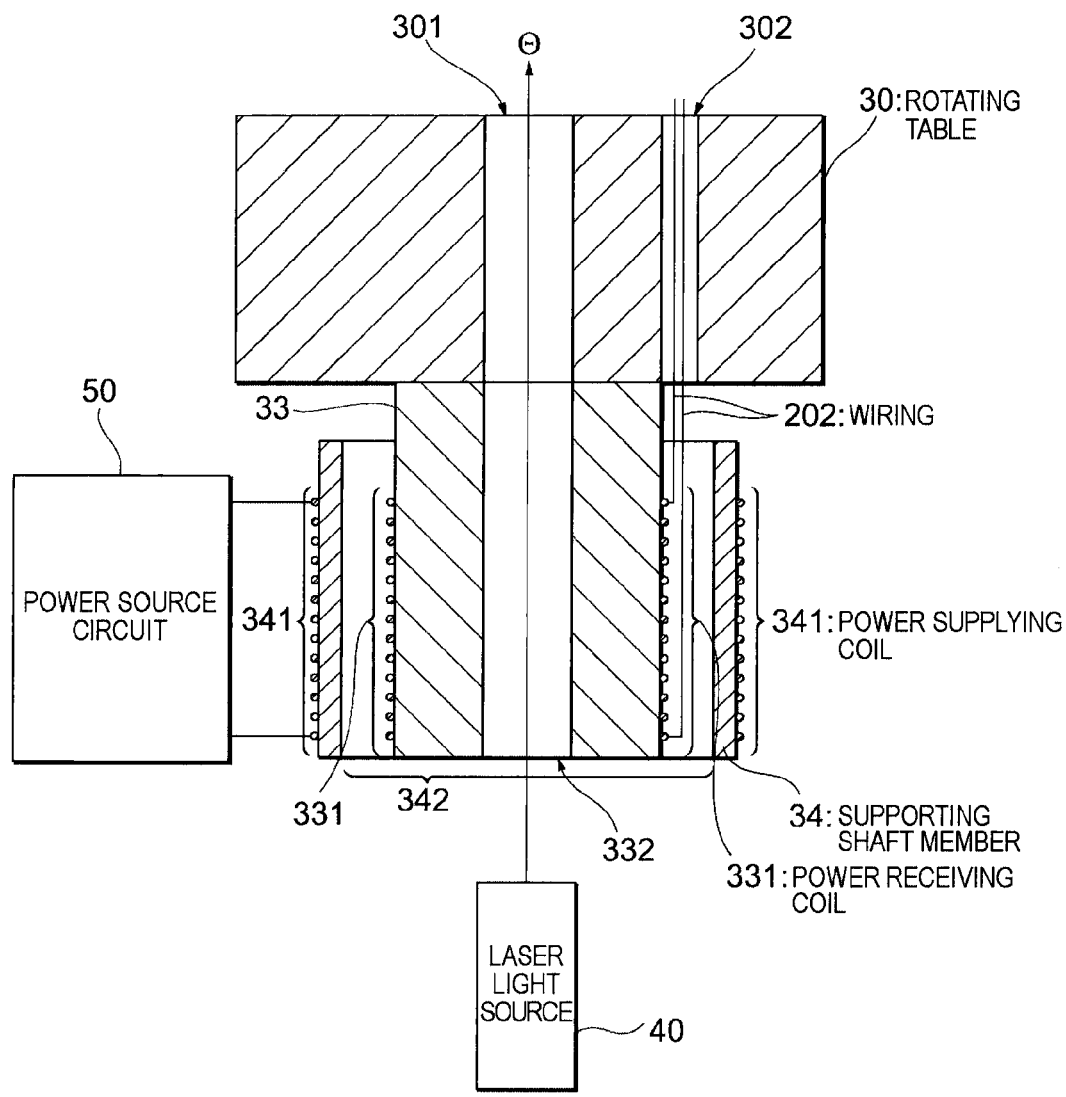
FIG. 6 is a sectional view schematically showing a non-contact power transmission structure according to a first modification of the embodiment.

FIG. 6 shows a first modification of the non-contact power transmission structure described above. FIG. 6 corresponds to the sectional view of FIG. 5. A structure of the first modification shown in FIG. 6 includes a rotating shaft member 33 provided to the rotating table 30 and rotating together with the table 30 (the optical scanner 20) and a supporting shaft member 34 rotatably supporting the rotating shaft member 33 which is inserted into the supporting shaft member 34 in a nesting state.

In the first modification, the rotating shaft member 33 is an example of a rotating member constituting the movable portion of the optical scanning apparatus 10 together with the rotating table 30. The supporting shaft member 34 is an example of a supporting member (or a fixed member) constituting the fixed portion of the optical scanning apparatus 10 and does not rotate (is fixed) even when the rotating table 30 and the rotating shaft member 33 rotate.

The rotating shaft member 33 is provided with a power receiving coil (first coil) 331 and the supporting shaft member 34 is provided with a power supplying coil (second coil) 341.

When the power supplying coil 341 receives power (current) supply from the power source circuit 50, the power supplying coil 341 generates an electromagnetic field corresponding to the received current. The power supplying coil 341 may be provided along a peripheral surface of the supporting shaft member 34. For example, a conductor (wiring material) having a predetermined length may be winded or a coil pattern may be formed, along a peripheral surface of the supporting shaft member 34.

The supporting shaft member 34 has a hollow structure having a hollow portion 342 of which a diameter is larger than an outer diameter, including the power receiving coil 331, of the rotating shaft member 33 so as to insert the rotating shaft member 33 in the hollow portion 342, that is, the member 34 has a cylindrical body. The rotating shaft member 33 can be inserted in the hollow portion 342 of the supporting shaft member 34 in a separated manner from the member 34 with an axial core thereof agreeing with an axial core of the member 34. Accordingly, the rotating shaft member 33 can freely rotate about the axial core of the supporting shaft member 34 in accordance with the rotation of the rotating table 30. As an example of a structure rotatably supporting the rotating shaft member 33 in the supporting shaft member 34, various bearing mechanisms such as a ball bearing are available.

The rotating shaft member 33 has a hollow structure having an open hole (hollow portion) 332 having a diameter, through which the light beam L can pass, that is, the member 33 has a cylindrical body, for example. A diameter (sectional area) of the open hole 332 may be same as that of the hollow portion 301 of the rotating table 30 as shown in FIG. 6, or may be different from that of the hollow portion 301. A cross-sectional shape of the open hole 332 is not limited to a circular shape, but may be a polygonal shape as long as the light beam L can pass the hole.

The rotating shaft member 33 may be provided on an opposite surface of a surface, on which the optical scanner 20 is provided, of the rotating table 30 in an integrated manner with the table 30 in a manner that an axial core thereof agrees with the rotation axis Θ of the rotating table 30. For example, the rotating shaft member 33 may be integrally formed to be a part of the rotating table 30, or may be bonded and fixed on the rotating table 30 as a separate member.

In this case, in accordance with the rotation of the rotating table 30, the rotating shaft member 33 rotates about the rotation axis Θ together with the rotating table 30 in the same direction as that of the rotating table 30, and the power receiving coil 331 provided on the peripheral surface of the rotating shaft member 33 also rotates in the same direction inside the supporting shaft member 34 (the hollow portion 342). Accordingly, tangle of wirings, caused by the rotation of the rotating table 30, between the power receiving coil 331 and the optical scanner 20 and resulting damage of the wirings can be prevented.

The power receiving coil 331 generates induction current (induced electromotive force) in response to electromagnetic induction action corresponding to the electromagnetic field which is generated by the power supplying coil 341. The power receiving coil 331 may be provided along the peripheral surface of the rotating shaft member 33. For example, a conductor (wiring material) having a predetermined length is winded or a coil pattern is formed, on a region, corresponding to the power supplying coil 341 provided on the peripheral surface of the supporting shaft member 34, of the peripheral surface of the member 33. Thus the coils 331 and 341 are respectively disposed on the peripheral surfaces of the members disposed in a nesting state, being able to efficiently perform power transmission from the power supplying coil 341 to the power receiving coil 331 due to the electromagnetic force action. Further, dimension, in a direction along the rotation axis Θ, of the rotating table 30 can be decreased.

Accordingly, induction current (induced electromotive force) generated in the power receiving coil 331 can be supplied to the optical scanner 20 by electrically connecting (wiring) the power receiving coil 331 to the optical scanner 20, being able to drive (turn) the movable plate 22 (the mirror 24). Here, power generated in the power receiving coil 331 can be used as drive power not only for driving the optical scanner 20 but also for driving a signal processing circuit and the like.

As shown in FIG. 6, the wirings 202 between the power receiving coil 331 and the optical scanner 20 can be formed through an open hole (hollow portion) 302, being able to reinforce the protection of the wirings 202. The open hole 302 is formed in the rotating table 30 toward the inside of the supporting shaft member 34 in a separate manner from the hollow portion 301. The open hole 302 can be provided such that a part of an inner wall thereof communicates with the peripheral surface of the rotating shaft member 33. In this case, the power receiving coil 331 and the optical scanner 20 can be linearly wired. Thus, the wiring is easy and a wiring distance is short, so that loss of transmitted power can be reduced. Here, a similar wiring method using the open hole 302 is applicable to the above mentioned embodiment.

A part (a part on which the power receiving coil 331 is provided, for example) of or the whole of the rotating shaft member 33 can be made of a magnetic material such as iron and ferrite. The rotating shaft member 33 made of the magnetic material functions as a magnetic member so as to serve as a magnetic core of the power supplying coil 341 and the power receiving coil 331. Consequently, more effective power transmission is realized. Not only the rotating shaft member 33 but also supporting shaft member 34 may be made of the magnetic material. In this case, the supporting shaft member 34 also functions as an example of the magnetic member.

The hollow portion 301 of the rotating table 30 and the open hole 332 of the rotating shaft member 33 communicate with each other, though their diameters (sectional areas) are different from each other. Accordingly, the light beam L outputted from the laser light source 40 can pass through the open hole 332 of the rotating shaft member 33 and the hollow portion 301 of the rotating table 30 so as to be incident on the optical scanner 20 (the mirror 24).

According to the first modification, a part or the whole of the rotating shaft member 33 having the open hole 332, through which the light beam can pass toward the optical scanner 20 (the mirror 24), is made of the magnetic material. Therefore, the rotating shaft member 33 functions as a magnetic core of the coils 331 and 341 which are provided respectively along peripheral surfaces of the rotating shaft member 33 and the supporting shaft member 34.

Accordingly, intensity of the electromagnetic field generated around the power supplying coil 341 is increased so as to be able to increase induction current generated in the power receiving coil 331. As a result, power transmission efficiency from the power supplying coil 341 to the power receiving coil 331, eventually, to the optical scanner 20 (the mirror 24) is improved so as to be able to easily supply sufficient drive power to the optical scanner 20.

Further, the power supplying coil 341 is provided along the peripheral surface of the supporting shaft member 34 positioned outside, and the power receiving coil 331 is provided along the peripheral surface of the rotating shaft member 33 which is housed in the hollow portion 342 of the supporting shaft member 34. Thus the coils 341 and 331 can be disposed in a nesting state around the rotation axis Θ of the rotating table 30. Accordingly, in addition to the improvement of the power transmission efficiency, a dimension in a direction along the rotation axis Θ can be decreased so as to realize a smaller non-contact power transmission structure.

The coils are disposed such that axial cores thereof agree or nearly agree with the rotation axis Θ of the rotating table 30 in the embodiment and the first modification, but the positions of the coils are not limited to the above. An example will be described in a second modification below.

Second Modification

Figure 7:
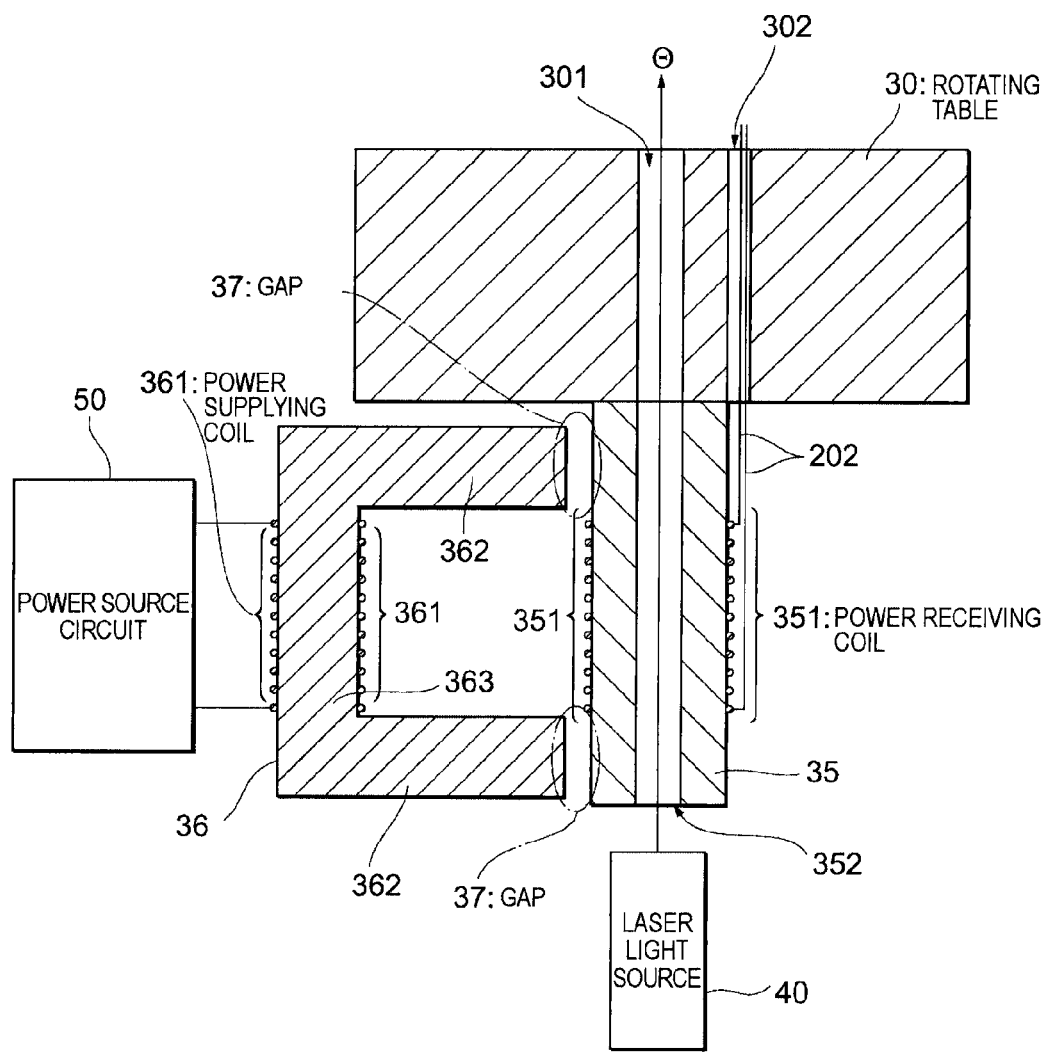
FIG. 7 is a sectional view schematically showing a non-contact power transmission structure according to a second modification of the embodiment.
Figure 8:
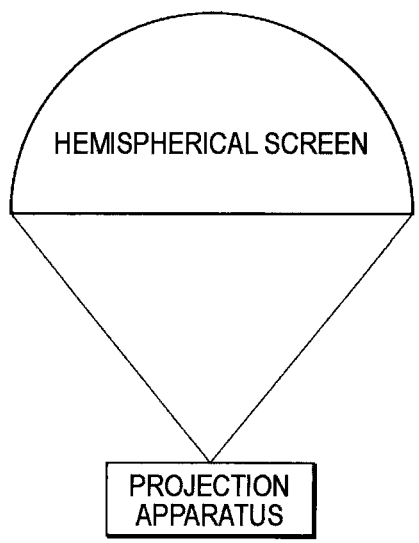
FIG. 8 is a schematic view showing a case where an image is projected on a hemispherical screen.
Figure 9:
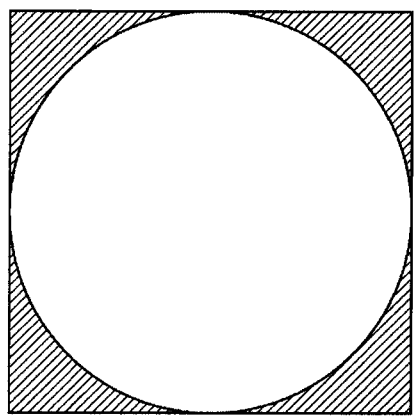
FIG. 9 is a diagram showing a scanning range in the projection illustrated in FIG. 8.

FIG. 7 shows a second modification of the non-contact power transmission structure. FIG. 7 corresponds to the sectional views of FIGS. 5 and 6. A structure of the second modification shown in FIG. 7 includes: a rotating shaft member 35 provided to the rotating table 30 to be rotatable with the rotating table 30; a magnetic body 36 provided to face a lateral surface of the rotating shaft member 35 with a predetermined space (gap) 37 interposed and having a square C-shaped section (or may have a U-shaped section); a power receiving coil 351 provided to the rotating shaft member 35; and a power supplying coil 361 provided at least a part of the magnetic body 36.

In the second modification, the rotating shaft member 35 is an example of a rotating member constituting the movable portion of the optical scanning apparatus 10 together with the rotating table 30. The magnetic body 36 is an example of a magnetic member constituting the fixed portion of the optical scanning apparatus 10 and does not rotate (is fixed) even when the rotating table 30 and the rotating shaft member 35 rotate.

When the power supplying coil 361 receives power (current) supply from the power source circuit 50, the power supplying coil 361 generates an electromagnetic field corresponding to the received current. The power supplying coil 361 may be provided along a peripheral surface of the magnetic body 36. For example, a conductor (wiring material) having a predetermined length may be winded or a coil pattern may be formed, along the peripheral surface of a part, except for leg parts 362, of the magnetic body 36. In other words, the magnetic body 36 functions as a magnetic core of the power supplying coil 361. A sectional shape on a plane including a diameter of the magnetic body 36 may be a circular shape or a polygonal shape.

The rotating shaft member 35 has a hollow structure having an open hole (hollow portion) 352 having a diameter, through which the light beam L can pass, that is, the member 35 has a cylindrical body, for example. A diameter (sectional area) of the open hole 352 may be same as that of the hollow portion 301 of the rotating table 30 as shown in FIG. 7, or may be different from that of the hollow portion 301. A cross-sectional shape of the open hole 352 is not limited to a circular shape, but may be a polygonal shape as long as the light beam L can pass the hole.

The rotating shaft member 35 may be provided on an opposite surface of a surface, on which the optical scanner 20 is provided, of the rotating table 30 to be integrated with the table 30 in a manner that an axial core thereof agrees with the rotation axis Θ of the rotating table 30. For example, the rotating shaft member 35 may be integrally formed to be a part of the rotating table 30, or may be bonded and fixed on the rotating table 30 as a separate member.

In this case, in accordance with the rotation of the rotating table 30, the rotating shaft member 35 rotates about the rotation axis Θ in the same direction as that of the rotating table 30, and the power receiving coil 351 provided on a peripheral surface of the rotating shaft member 35 also rotates in the same direction. Accordingly, tangle of wirings, caused by the rotation of the rotating table 30, between the power receiving coil 351 and the optical scanner 20 and resulting damage of the wirings can be prevented. Here, since the gap 37 is formed between the rotating shaft member 35 and the leg part 362 of the magnetic body 36, the magnetic body 36 and the power supplying coil 361 do not rotate even when the rotating shaft member 35 rotates.

The power receiving coil 351 generates induction current (induced electromotive force) in response to electromagnetic induction action corresponding to the electromagnetic field which is generated by the power supplying coil 361. The power receiving coil 351 may be provided along the peripheral surface of the rotating shaft member 35. For example, a conductor (wiring material) having a predetermined length is winded or a coil pattern is formed, on a region of the peripheral surface corresponding to a region between the leg parts 362 of the magnetic body 36 having the square C-shape (in other words, between gaps 37).

Thus, the power receiving coil 351 is provided along a part, which corresponds to a part between the leg parts 362 of the magnetic body 36 having the square C-shape, of the peripheral surface of the rotating shaft member 35, being able to perform efficient power transmission from the power supplying coil 361 of the magnetic body 36 to the power receiving coil 351 by electromagnetic force action. Further, dimension in a direction along the rotation axis Θ of the rotating table 30 can be decreased. Here, electromagnetic induction electromotive force can be more efficiently transmitted as the gaps 37 are made smaller.

Accordingly, induction current (induced electromotive force) generated in the power receiving coil 351 can be supplied to the optical scanner 20 by electrically connecting (wiring) the power receiving coil 351 to the optical scanner 20, being able to drive (turn) the movable plate 22 (the mirror 24). Here, power generated in the power receiving coil 351 can be used as drive power not only for driving the optical scanner 20 but also for driving a signal processing circuit and the like.

In the second modification as well, the wirings 202 between the power receiving coil 351 and the optical scanner 20 can be formed to go through the open hole 302 provided to the rotating table 30 separately from the hollow portion 301 as shown in FIG. 7. The open hole 302 can be provided such that a part of an inner wall thereof communicates with the peripheral surface of the rotating shaft member 35. In this case, the power receiving coil 351 and the optical scanner 20 can be linearly wired to each other. Thus, the wiring is easy and a wiring distance is short, so that loss of transmitted power can be reduced.

The hollow portion 301 of the rotating table 30 and the open hole 352 of the rotating shaft member 35 communicate with each other, though their diameters are different from each other. Accordingly, the light beam L outputted from the laser light source 40 can pass through the open hole 352 of the rotating shaft member 35 and the hollow portion 301 of the rotating table 30 so as to be incident on the optical scanner 20 (the mirror 24).

According to the second modification, induction electromotive force can be more efficiently transmitted from the power supplying coil 361 provided on the magnetic body 36 functioning as the magnetic core to the power receiving coil 351 provided to the rotating shaft member 35 which rotates together with the rotating table 30. Accordingly, power transmission efficiency from the power receiving coil 351 to the optical scanner 20 (the mirror 24) is improved so as to be able to easily supply sufficient drive power to the optical scanner 20.

Further, the power supplying coil 361 is provided along the peripheral surface of the magnetic body 36 which is separately formed from the rotating shaft member 35, being able to improve latitude of the disposing relationship of the coils. Accordingly, by disposing the magnetic body 36 to face the lateral surface of the rotating shaft member 35 with the gap 37 interposed as shown in FIG. 7, the power transmission efficiency can be improved and the dimension along the rotation axis Θ of the rotating table 30 can be reduced to realize a smaller non-contact power transmission structure.

Image Forming Apparatus

The optical scanning apparatus 10 having the non-contact power transmission structure described above is applicable to an image forming apparatus such as a projector, of which a projection screen has a three dimensional shape such as a cylindrical shape and a hemispherical shape, and an image display. That is, a light beam can be emitted and scanned by controlling an reflecting angle of the mirror 24. An emitted destination can be set on a three dimensionally-shaped screen. As a result, an image forming apparatus having superior imaging characteristics can be provided.

What is claimed is:

1. An optical scanning apparatus for scanning light from a light source, comprising:
    a rotating member, the rotating member rotating about a rotation axis parallel with an optical axis of the light, the rotating member being provided with a first coil;
    a mirror mounted to the rotating member, the mirror being electrically connected with the first coil, the mirror reflecting the light in a variable angle with respect to the optical axis of the light; and
    a second coil capable of supplying an electromagnetic field to the first coil.

2. The apparatus of claim 1 wherein the first coil surrounds a shaft that rotates with the rotating member.

3. The apparatus of claim 2 wherein the second coil is fixed.

4. The apparatus of claim 3 which further comprises a laser light source.

5. The apparatus of claim 4 wherein the rotating member and shaft have openings therein through which light from the laser passes to the mirror.

6. The apparatus of claim 5 which further comprises wiring connecting the first coil to the mirror.

7. The apparatus of claim 6 further comprises a power source connected to the second coil, with the second coil providing energy to the first coil that is used to move the mirror about an axis different from an optical axis of the laser.

* * * * *